US005528295A

United States Patent [19]
Wagner

[11] Patent Number: 5,528,295
[45] Date of Patent: Jun. 18, 1996

[54] COLOR TELEVISION CAMERA USING TUNABLE OPTICAL FILTERS

[75] Inventor: Harvey L. Wagner, Royersford, Pa.

[73] Assignee: Martin Marietta Corp., East Windsor, N.J.

[21] Appl. No.: 234,771

[22] Filed: Apr. 28, 1994

[51] Int. Cl.⁶ ................................................. H04N 9/07
[52] U.S. Cl. ..................... 348/269; 348/273; 348/281; 354/430; 250/226
[58] Field of Search ...................... 348/266, 268, 348/269, 272, 273, 274, 280, 281, 817, 70; 359/885, 890; 354/430; 250/208.1, 226; A04N 9/07, 5/335

[56] References Cited

U.S. PATENT DOCUMENTS

| | | | |
|---|---|---|---|
| 4,323,918 | 4/1982 | Bendall | 348/337 |
| 4,437,764 | 3/1984 | Levine et al. | 348/242 |
| 4,471,388 | 9/1984 | Dischert | 358/906 |
| 4,507,679 | 3/1985 | Bendall | 348/238 |
| 4,621,329 | 11/1986 | Jacob | 364/455 |
| 4,875,091 | 10/1989 | Yamada et al. | 348/269 |
| 4,933,541 | 6/1990 | Dufour | 250/226 |
| 5,001,556 | 3/1991 | Nakamura et al. | 348/70 |
| 5,210,409 | 5/1993 | Rowe | 150/227.18 |
| 5,374,956 | 12/1994 | D'Luna | 348/280 |
| 5,387,920 | 2/1995 | Bos et al. | 345/88 |

OTHER PUBLICATIONS

Tech Memo on Fabry–Perot Interferometry (undated), published by Burleigh Instruments, Inc. Fishers, NY.

Primary Examiner—Safet Metjahic
Assistant Examiner—Jeffrey S. Murrell
Attorney, Agent, or Firm—W. H. Meise; C. A. Berard; S. A. Young

[57] ABSTRACT

A color television camera includes a panchromatic light sensor such as a CCD imager. Light from a scene to be imaged is filtered by an electronically controlled light filter such as an etalon, which is scanned from color to color at the field rate, so that the image for each field is generated by a different color. The periodic spectral line or spectral band response of a single etalon is improved by a cascade of two etalons with different periodicity, which pass only a single spectral line or band. When an RGB color sequence is used, a complete color signal frame is generated in three fields. The imager may be operated at a field rate higher than the standard field rate, such as 90 Hz. for use with conventional 30 Hz. color frame rate, and a memory may be coupled to the output of the imager to store the three-field sequence of signals which occurs during each standard color frame, so that a complete color signal is available during each standard color frame. In the context of a spectrometer, the filter may be sequenced through a set of spectral responses which are characteristic of the light reflected from a particular material. A similar imager/filter combination may be used for spectrography as a "tricorder".

13 Claims, 9 Drawing Sheets

COLOR TELEVISION CAMERA USING TUNABLE OPTICAL FILTERS

FIELD OF THE INVENTION

This invention relates to color television cameras, and more particularly to color television cameras which use a panchromatic or black-and-white sensor together with color filters to produce color image signals, and which cameras may find use as spectrometers.

BACKGROUND OF THE INVENTION

Color television systems, as originally introduced, used a panchromatic or black-and-white light sensing tube together with a color wheel synchronized to the field rate then in use for monochrome. This color system had the major disadvantages that (a) the receivers depended upon visual persistence of the color image over three sequential fields, and (b) the receivers required that a large color wheel be synchronized with the received field rate. These problems might have been overcome with improved technology, but the adoption in 1953 of the current compatible color system and subcarrier standards, and the introduction of the shadow-mask color kinescope, and later of trinitron, eliminated interest in sequential color systems.

For many years, color television cameras used three vacuum-tube light sensors, together with light-splitting arrangements which separated light incident from the scene being televised into red, green, and blue components, or into their complementary colors cyan, magenta and yellow. These vacuum-tube sensors included such panchromatic devices as iconoscopes, image orthicons, and vidicons. The sensors included a light-sensitive screen, and arrangements for producing line-scan signals representative of the light pattern falling onto the screen. More recently, solid-state light sensor arrays such as charge-coupled device (CCD) arrays have been introduced. The CCD sensors have no inherent degradation with time, and are rugged, small and lightweight by comparison with their vacuum-tube counterparts, and can be made to produce line-scan signals similar to those produced by the vacuum-tube devices. These devices initially replaced the image tubes in portable cameras, but are now starting to replace the vacuum image tubes in studio cameras. For home color camcorder use, a single CCD imager is desirable for cost reasons. A single CCD imager with a color wheel is described in U.S. Pat. No. 4,471,388, issued Sep. 11, 1984 in the name of Dischert. This suggestion does not appear to have resulted in any actual use. Single-CCD arrangements using patterned color filters over the CCD imager, such as the stripe filters described, for example, in U.S. Pat. No. 4,437,764, issued Mar. 20, 1984 in the name of Levine et al., have found use for home camcorders. Various checkerboard color filter patterns have also been described, but these filters tend to degrade the color response of a CCD imager, because elements responsive to particular colors are widely separated and may result in aliasing, and these schemes also require the color filters to be correctly registered with the CCD sensor elements to prevent further degradation. The CCD color sensor for higher-performance applications may include a plurality of color-splitting prisms and CCD imagers bonded together into a single rugged, nonadjustable package, as described in U.S. Pat. No. 4,323,918, issued Apr. 6, 1982, and in U.S. Pat. No. 4,507,679, issued Mar. 26, 1985, both in the name of Bendell.

Improved television cameras or imagers are desired.

SUMMARY OF THE INVENTION

A television camera includes a two-dimensional light sensor, such as a CCD imager, for controllably generating line-scan signals representative of a light pattern falling thereon; and the camera also includes a light path terminating at the light sensor. The light path may be focussed by an optical lens system. An electronically scannable-wavelength color filter arrangement is associated with the light sensor, for intercepting light travelling toward the light sensor, and for controllably preventing at least one spectral line or band of light (a color) from travelling along the light path toward the light sensor, or for preferentially passing or transmitting to the light sensor a spectral line or spectral band. In one embodiment of the invention, the scannable color filter includes an electronically controlled color filter such as an etalon, which preferentially passes a desired spectral line or band. A light sensor controller is coupled to the light sensor for operating the light sensor for generating a particular number of line-scan signals during each of a plurality of sequential field intervals of a recurrent set of field intervals. In the context of an RGB color camera, three sequential fields (the Red, Green, and Blue fields) constitute the set of fields, and also constitute a color frame. The light sensor controller, in the context of a CCD imager, includes a clock arrangement which determines the integration time, and which generates the charge transfer clock signals. A color filter control arrangement is coupled to the light sensor controller and to the color filter, for controlling the light filter in synchronism with the light sensor in such a manner that a different set of colors of light falls on the light sensor from the light path during each of the sequential field intervals of a color frame, whereby the light sensor generates line-scan signals with field-sequential color characteristics. An etalon filter selectively passes a plurality of unwanted spectral lines or bands (colors) together with the desired spectral line or band, which undesirably degrades the color performance of the camera. According to a further aspect of the invention, a second color filter or etalon is coupled in cascade or in tandem to the first, so that the light travelling along the light path toward the light sensor is filtered by both color filters. The second filter has a different color characteristic than the first filter, or in the context of an etalon, the second etalon has a different periodic spacing (Free Spectral Range or FSR) of its spectral lines, so that its spectral response can match that of the first etalon only for one spectral line or band, which is selected to be the desired spectral line or band. The remainder of the light is filtered out by one of the two etalon filters. The second color filter may also be electronically controlled. The imager may be operated at a field rate, such as 90 Hz., which is higher than the standard 60 Hz. vertical field rate, for use with a conventional 30 Hz. color frame rate, and a memory may be coupled to the output of the imager to store the three-field sequence of signals which occurs during each standard color frame interval, so that a complete color signal is available during each standard color frame. As an alternative, the color sequence may be used directly for a display on a monitor at the higher field rate. In the context of a spectrometer, the filter may be sequenced through a set of spectral responses which are characteristic of the light reflected from, or produced by, a particular material. In one embodiment of the invention, a fixed-tuned etalon with a broad spectral response is cascaded with a frequency-variable narrow spectral response etalon.

DESCRIPTION OF THE INVENTION

Figure 1:
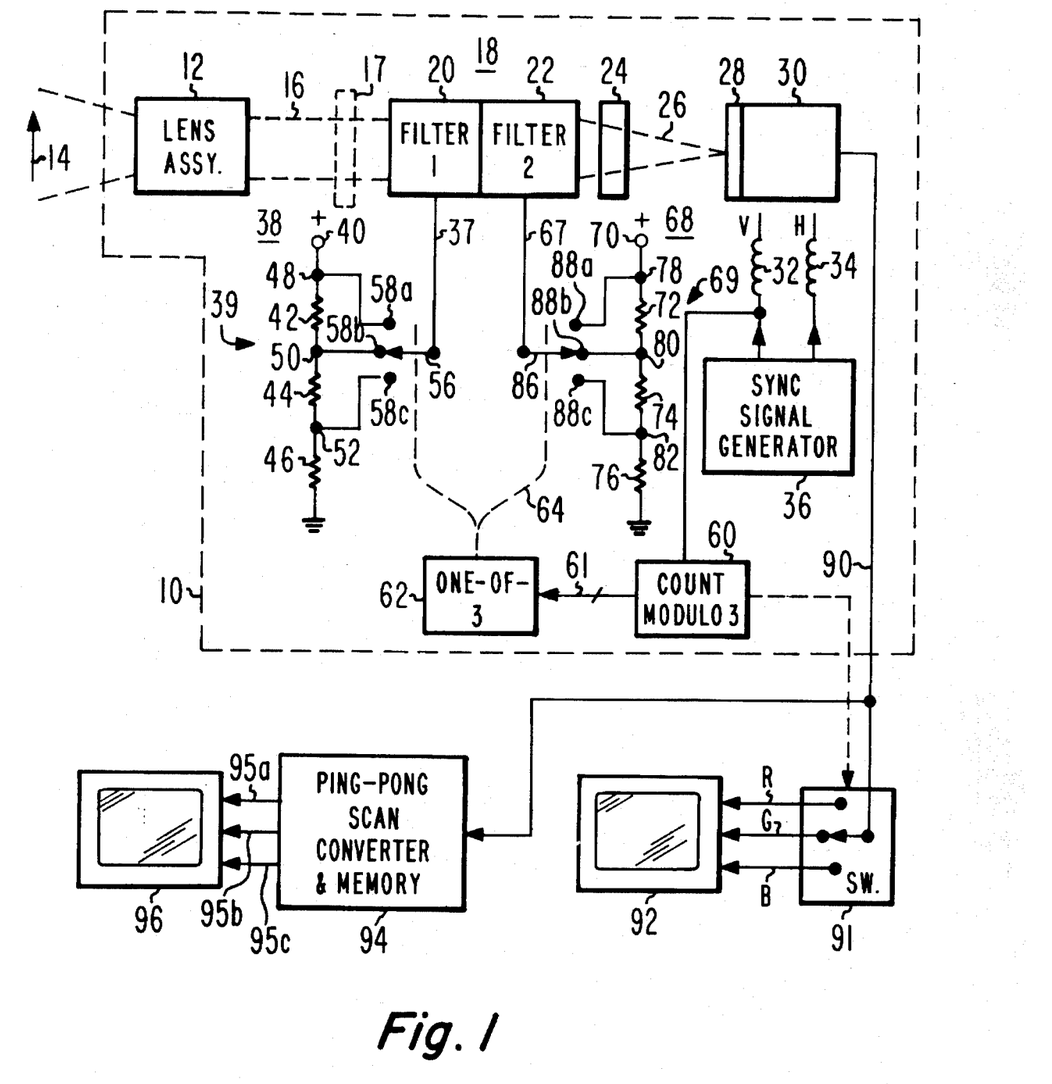
FIG. 1 is a simplified block diagram of a color television camera according to the invention, using an electronically tuned agile color filter and a single imager.

In FIG. 1, a television camera 10 according to the invention includes a lens arrangement 12 for imaging a scene 14 to form a collimated beam of light 16. The collimated beam of light passes through a color filter arrangement 18 which includes a first agile, electronically controlled color filter 20 in cascade with a second like color filter 22.

Color-filtered light from the output of filter 22 is focussed by a lens 24, to produce focussed light 26 which, in turn, produces an image on the two-dimensional light-sensitive surface 28 of a panchromatic (black-and-white) line-scannable imager or camera apparatus 30. Camera 30 may be a vacuum tube or a solid-state device for purposes of the invention, although solid-state devices are preferred.

Line scanning of imager or camera 30 of FIG. 1 is controlled by a synchronization signal generator 36, which produces vertical and horizontal signals and pulses (in the case of a vacuum tube imager) which are applied to vertical (V) and horizontal (H) deflection coils 32 and 34, respectively. If imager or camera 30 is a CCD imager, generator 36 produces appropriate multiphase charge-transfer clock signals and other necessary signals. However it is scanned, imager 30 produces signals on an output signal path 90 which represent a raster line scan, repeated at a field rate, of the luminance of the image focussed onto light-sensitive surface 28. Conventional monochrome and NTSC standards require a line scan rate of about 15,750 Hz. and a field repetition rate of 60 Hz. As described below, it may be desirable to scan at a higher rate.

According to an aspect of the invention, at least one of color filters 20 and 22 is an electronically tunable etalon. In FIG. 1, both color filters 20 and 22 are electronically tuned etalons, which are controlled by voltages applied thereto over conductors 37 and 67 from controllable voltage sources designated 38 and 68, respectively. Voltage source 38 includes a voltage divider 39 connected between a voltage terminal 40 and ground. Voltage terminal 40 may receive a direct voltage, or preferably a voltage which alternates relative to ground. Voltage divider 39 includes resistors 42, 44, and 46, and has taps 48, 50, and 52. A controllable single-pole, multiple throw switch 56, illustrated by a mechanical switch symbol for ease of understanding, includes switch terminals 58a, 58b, and 58c connected to taps 48, 50, and 52, respectively. Those skilled in the art know that electronic switches are preferred to mechanical switches. As the position of switch 56 is moved among its three possible positions under control of electrical or mechanical signals applied over paths 64, different magnitudes of direct or alternating voltages, as established by the characteristics of voltage divider 39, are coupled by conductor 37 to etalon 20. Similarly, voltage divider 69 includes resistors 72, 74, and 76, and has taps 78, 80, and 82. A controllable single-pole, multiple throw switch 86 includes switch terminals 88a, 88b, and 88c connected to taps 78, 80, and 82, respectively. As the position of switch 86 is moved among its three possible positions, different voltages, as established by the characteristics of voltage divider 69, are coupled by way of a conductor 67 to etalon 22.

A counter 60 is coupled to the vertical deflection output of sync signal generator 36 of FIG. 1, for counting vertical synchronization pulses, modulo 3. Thus, counter 60 counts the vertical synchronization pulses in sets of three, and identifies the current count on an output signal path 61. A decoder 62, also known as a one-of-N circuit, is coupled to signal path 61, and decodes the current field of the three-field sequence. In response to the current field, one-of-three circuit 62 controls the positions of switches 56 and 86 by way of paths 64, so that the voltage applied to each etalon 20 and 22 is selected in accordance with the particular field of the three-field sequence which is currently being received by light sensitive surface 28 of imager 30. As described below, the cascaded color filters can be sequenced to provide conventional red, green and blue (RGB) colors, with the result that the signal produced on output signal path 90 of image 30 is a field-sequential RGB color signal.

The field-sequential color signal on output signal path 90 of FIG. 1 may be applied to a conventional monitor by means of a simple sequencing switch illustrated as 91, which routes the line-scan signals in field sequence to the R, G and B input ports of the monitor. Monitor 92 will display a three-field color sequence. At a conventional field rate of 60 Hertz, the color frame refresh rate of 20 Hz. may be low enough so that visual persistence may not provide satisfactory color rendition, but this is easily remedied by operating camera 10 at a higher field rate, such as 90 or 120 Hz. With a 120 Hertz camera field rate, each complete color frame (three sequential fields in the example) occurs at a 40 Hz rate, which should provide better color rendition than the 20 Hz. refresh rate. In principle, there is no limitation to the field rate, because of the agility of the electronically tuned color filters.

Instead of directly displaying the field-sequential color signal produced by camera 10 of FIG. 1 on output signal path 90, it may be desirable to convert the signal into a conventional format. This is readily accomplished by a scan rate converter 94, many types of which are known. The essence of such scan converters is that they store the source signal as it is generated, and read from the store in a manner which satisfies the requirements of the output signal standards. If, for example, camera 10 produces field-sequential color signals at a 90 Hertz rate, a sequence of three color fields, constituting a complete color picture, is generated at a 30 Hz. rate. A 30 Hz. rate corresponds with the color frame rate of a conventional NTSC color signal. Scan converter 94 includes a "ping-pong" memory, in which two memories are available, one of which is loaded by the source (the camera) while the other is read to generate the converted signal, as described in more detail below.

Figure 2:
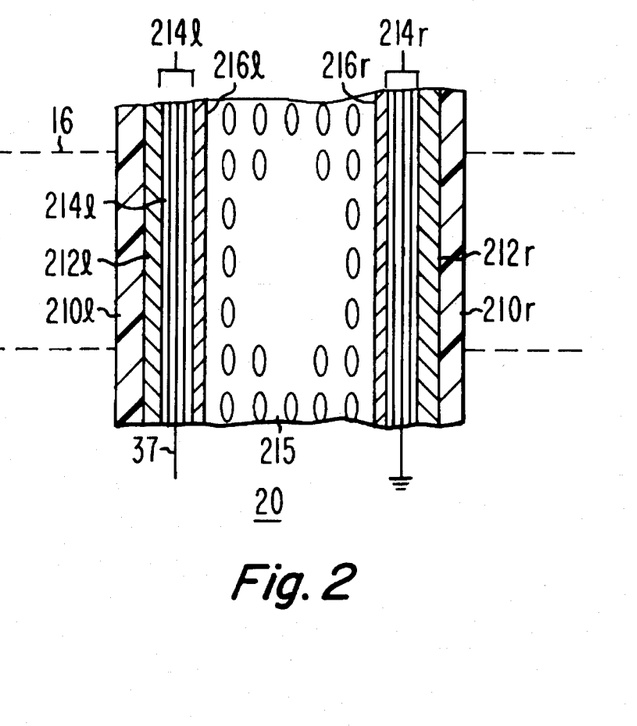
FIG. 2 is a cross-sectional representation of a liquid-crystal etalon color filter which may be used in the arrangement of FIG. 1.

The salient property required of color filters 20 and 22 of FIG. 1 is that they be controllably tunable. FIG. 2 is a more detailed diagram of a color filter of FIG. 1. For definiteness, color filter 20 is represented. In FIG. 2, color filter 20 is a tunable liquid-crystal Fabry-Perot etalon, also known generally as a Fabry-Perot interferometer, tunable etalon, resonant cavity interferometer, and the like. Color filter 20 of FIG. 2 includes transparent silica or quartz left and right substrates 210l and 210r, respectively, which preferably have mutually parallel interior surfaces. The inside surfaces of substrates 210l and 210r are each coated with a layer 212l, 212r, respectively, of transparent electrical conductor material, which may be, for example, tin oxide or indium-tin oxide. Conductive layer 212r is connected to ground, and conductive layer 212l is connected to conductor 37 for receiving voltages which change in accordance with the current field being processed, as described above in conjunction with FIG. 1. A partially transparent or semitransparent reflector 214l overlies electrically conductive layer 212l, and a similar semitransparent reflector 214r overlies conductor 212r. Such a semitransparent reflector layer corresponds conceptually to a "half-silvered" or "one-way" mirror, but such half-silvered mirrors tend to have high attenuation or loss. Instead, semitransparent reflector layers 214l and 214r are layered dielectrics, known in the art for low loss, selected to produce the desired semi-transparency and reflectivity. A cavity 215 lying between semitransparent reflectors 214l and 214r is filled with liquid crystal material. A further pair of layers 216l and 216r of buffed polyimide may be placed on reflector layers 214l and 214r, respectively, for aiding in aligning the molecules of the liquid crystal.

The liquid crystal material filling cavity 215 of the etalon of FIG. 2 exhibits birefringence, which is a difference in the index of refraction, depending upon the polarization of the light which passes therethrough relative to the orientation of the liquid crystals. This may be explained by noting that under normal, unenergized conditions, the liquid crystal material in cavity 215 tends to assume a "crystalline" form, with the molecules aligned in a particular direction, illustrated in FIG. 2 as being the vertical direction. The direction of the preferred orientation may be controlled by forming mutually parallel grooves in the polyimide interior surfaces facing the cavity, which orient the molecules adjacent the surface parallel to the grooves, and thereby establish the "crystal" orientation. Under the condition of vertical molecular alignment, light which is principally polarized vertically will experience a particular propagation delay, which relates to the index of refraction. When a voltage is applied by way of conductor 37 to generate an electric field across the liquid crystal material in cavity 215, the molecules of the liquid crystal material tend to rotate approximately 90° to become parallel with the field, whereupon they are no longer parallel to the electric field component of the incident light, and the propagation delay, and consequently the index of refraction, changes. The change in delay corresponds to changing the effective length of cavity 20 as a function of the applied voltage. Whatever the actual mechanism by which the result is accomplished, an etalon such as that described in conjunction with FIG. 2 has the property of filtering light at frequencies which depend upon the applied voltage. Some embodiments of an etalon filter may exhibit preferred axes of polarization, i.e. the performance is best for a particular polarization of light passing therethrough. A polarizing filter, illustrated as 17 in FIG. 1, may be inserted into the light path for best performance.

As known to those skilled in the art, Fabry-Perot etalons typically have a periodic filter function given by $$2n\, d\, \cos\theta = m\lambda \qquad (1)$$

where n is the refractive index of the medium;

d is the mirror spacing;

$\theta$ is the inclination of the normal of the mirrors;

m is the order of the interference; and $\lambda$ is the wavelength.

For the case of mutually parallel mirrors, $\cos\theta$ is unity. In general, the etalon passes or transmits light at a wavelength at which the cavity length is a multiple of fractional submultiples of a wavelength. This may be understood by considering that, in order to transmit light, the multiple internal reflections must constructively add at the output semitransparent layer, and that an even number of reflections must occur for light to exit. The comb or multispectral response of one of the etalons, such as etalon 20 of FIG. 1, is illustrated by plot 310 of FIG. 3. As illustrated, the transmission peaks occur periodically at wavelengths of 564, 580, 597, 616, 635, and 655 nm. A single such filter passes or transmits a relatively large number of such spectral lines or spectral bands, and good color separation might be difficult to achieve.

Figure 3:
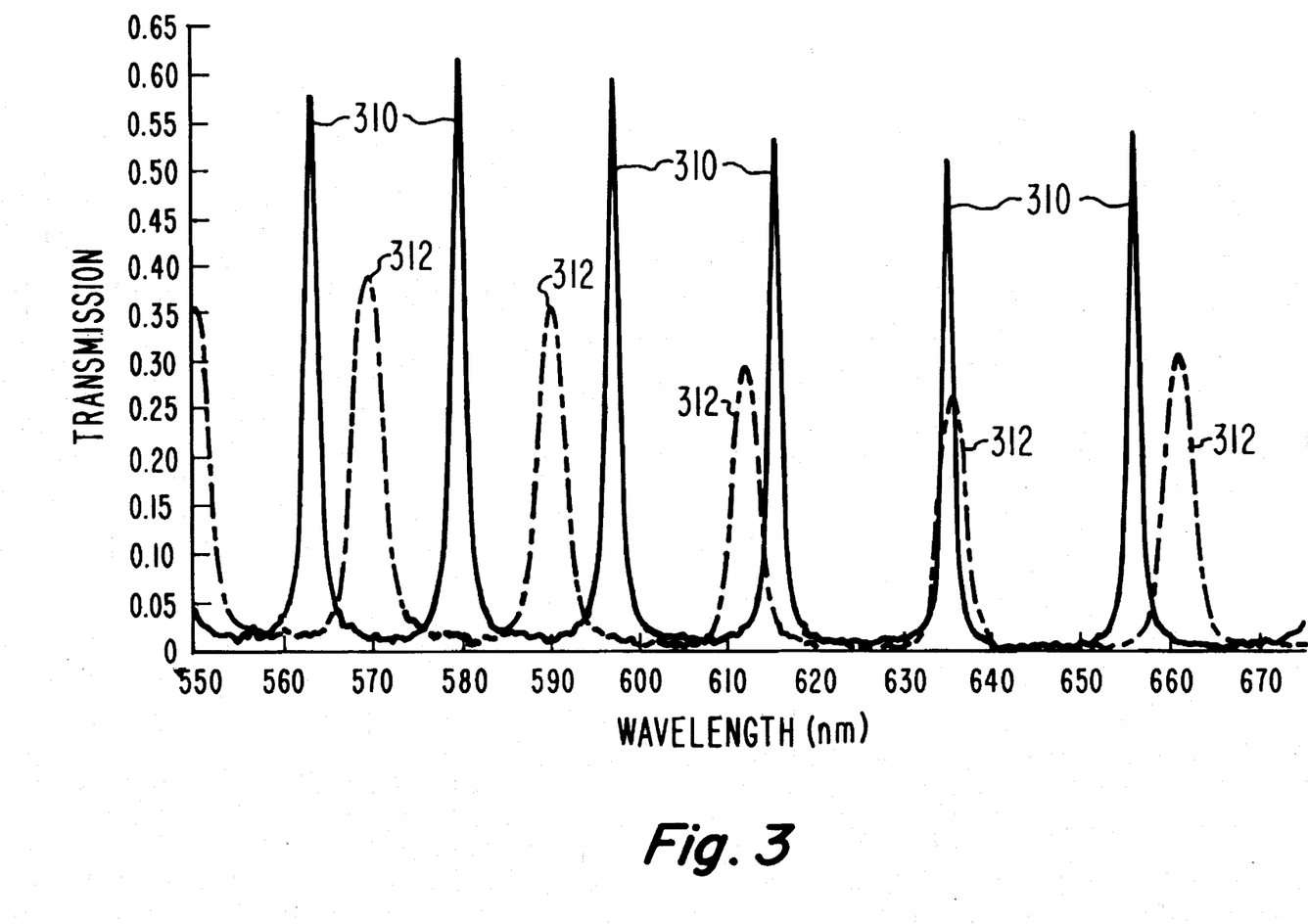
FIG. 3 separately illustrates plots of the transmission response of two individual etalon color filters.
Figure 4A:
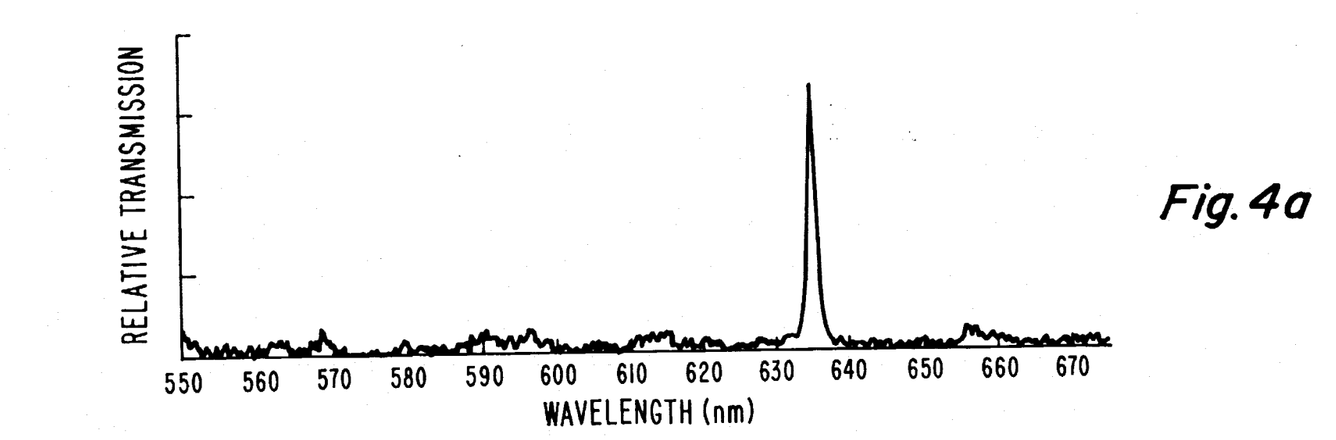
FIGS. 4a and 4b illustrate the combined transmission response of a color filter including two tandem or cascaded etalon filters, with different voltage settings to filter at different colors.
Figure 4B:
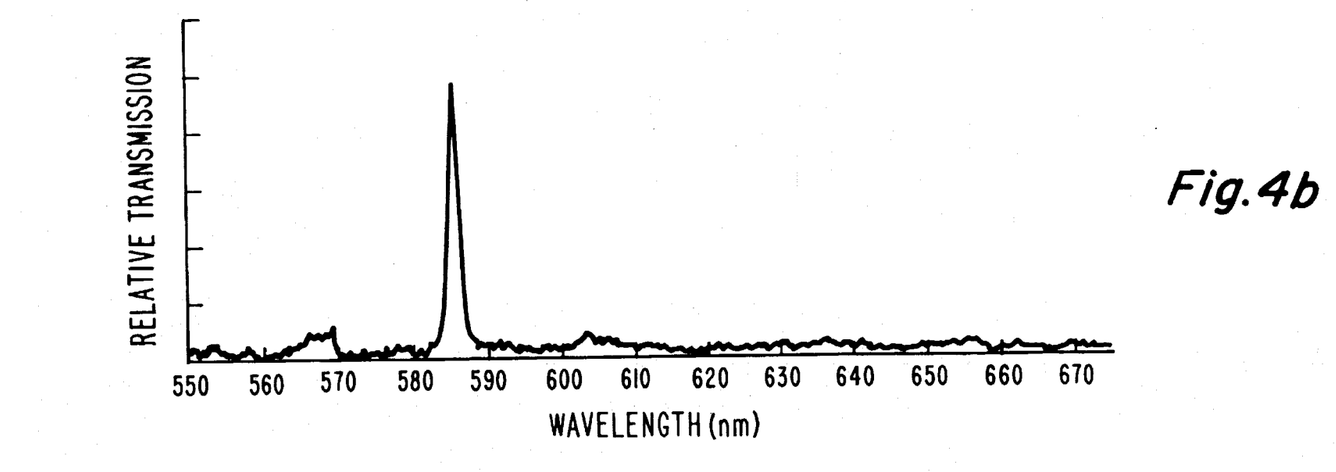

According to an aspect of the invention, color filter 22 of FIG. 1, which is cascaded with filter 20, is similar in construction to color filter 20 illustrated in FIG. 2, but its characteristics are modified to produce a comb spectrum different from comb spectrum 310 of FIG. 3. This is most readily accomplished by making the width of cavity 215 of FIG. 2 of the two filters 20 and 22 of different dimensions, which changes the "order number" m of equation (1), which, together with other parameters, determines the filter transmission spectrum. Plot 312 of FIG. 3 represents the transmission spectrum of a filter with different characteristics than the filter having plot 310. As illustrated, plot 312 has transmission peaks at about 551, 569, 590, 612, 635, and 661 nm. None of these transmission peaks, except the peak at about 635 nm, corresponds with a transmission peak of plot 310. Consequently, the only spectral line or band which is transmitted by both filters is the one which peaks at about 635 nm, and one or the other of the filters attenuates or rejects all other wavelengths. Thus, the cascade of filters 20, 22 of FIG. 1, when set to voltages giving the spectral responses illustrated in FIG. 3, passes only 635 nm, corresponding to a red hue. A green hue at about 550 nm could be transmitted by the pair of filters, by leaving filter 22 of FIG. 1 with the response illustrated as 312 in FIG. 3, and by modifying response 310 of filter 20 to move the set of peaks of plot 310 to the left, toward smaller wavelengths, until the peak illustrated at 562 nm overlies the peak at 550 nm. Blue colors at about 480 nm are not illustrated in FIG. 3, but the same principles apply to blue colors. While retuning of a single filter may provide color filtering, optimum color response may require retuning both filters by the arrangement of FIG. 1. FIGS. 4a and 4b are plots of the spectral response of a pair of cascaded filters 20 and 22, with both filters retuned for optimum combined response. In FIG. 4a, the combined transmission response is at 634 nm, and in FIG. 4b, the combined transmission response is at 585 nm.

Those skilled in the art know that the bandwidth of the etalon filter transmission peaks may be controlled by, for example, controlling the amount of transmission provided by partially-reflective surfaces 214 of FIG. 2.

Figure 5:
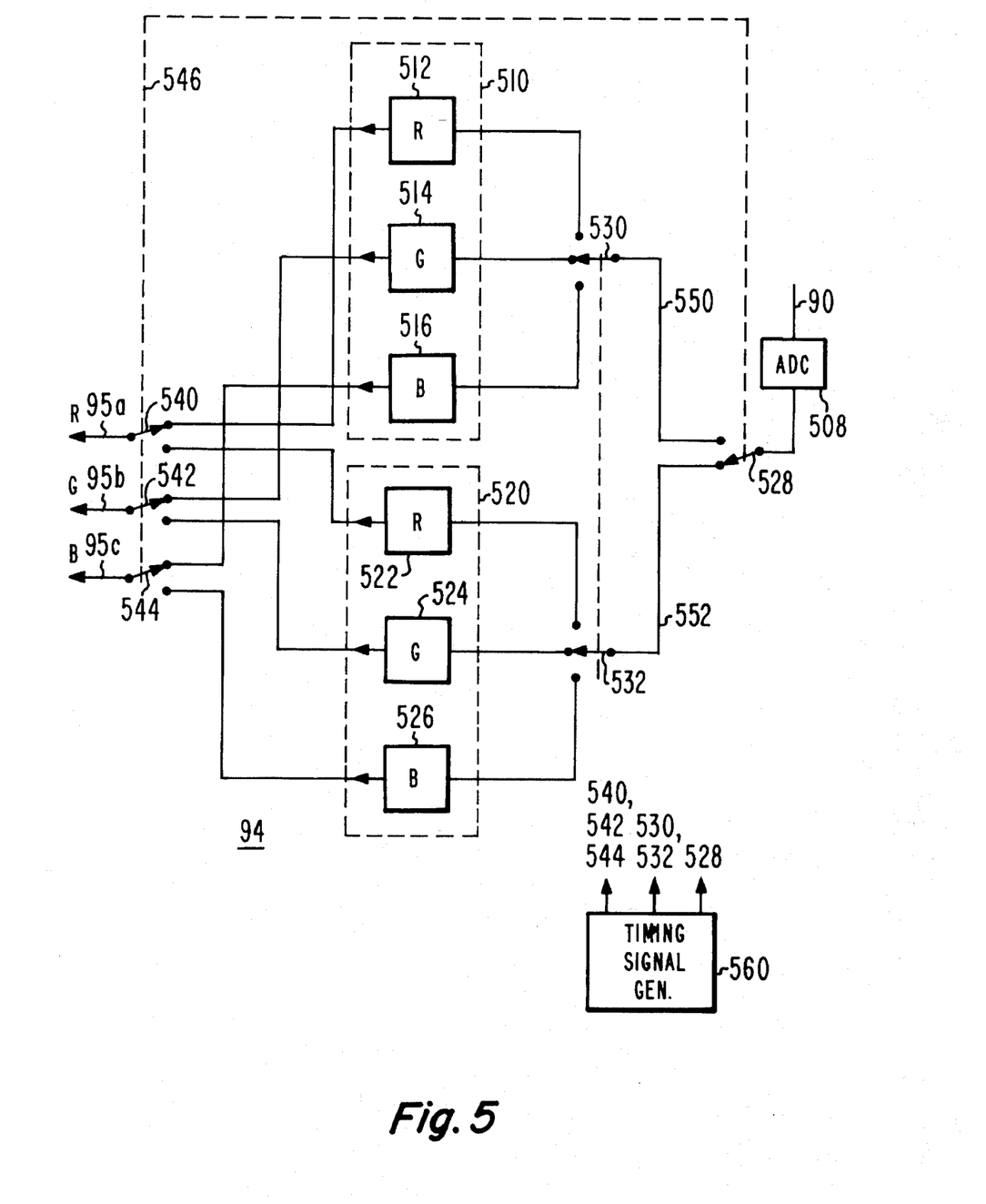
FIG. 5 is a simplified block diagram of the scan converter of FIG. 1.

FIG. 5 is a simplified block diagram of scan converter 94 of FIG. 1. In FIG. 5, 90 Hz. field-sequential R, G, and B signals arrive over signal path 90, are converted to digital form in an analog-to-digital converter (ADC) 508, and the resulting digital signals are applied to the common element of a single-pole, double-throw switch 528. While switch 528 is illustrated as having a single contact, those skilled in the art know that as many effective contacts must be provided as there are bits in the digital signal. Each of the three fields has a duration of 0.0111 . . . seconds, and a three-field sequence thus requires 0.0333 . . . seconds (1/30second) to complete. Switch 528 alternates or cycles at a 15 Hz rate. Switch 528 couples alternate RGB field sequences ("odd" and "even" frames) between an upper path 550 and a lower path 552, that is to say that switch 528 couples an R, G and B field to upper path 550 for the 0.0333 . . . second duration of one-half a 15 Hz. cycle, corresponding to the loading of the first or odd color frame generated by imager 30 of FIG. 1, and during the other half of the 15 Hz. cycle, it couples the next following R, G and B field sequence (the second or even frame generated by imager 30) to lower path 552. Signals taking the upper path 550 during first 0.0333 . . . second frame interval are coupled to a single-pole, triple throw switch 530, which sequences from one position to the next every 0.0111 . . . seconds, corresponding to a 90 Hz. rate, to couple the individual R, G, and B fields of the RGB field sequence of the first (and subsequent odd) frame(s) to RAM memories 512, 514 and 516, respectively, for storage therein. Signals taking lower path 552 during alternate 0.0333 . . . second intervals (during even frames) are similarly coupled to a single-pole, triple throw switch 532, which also sequences at a 90 Hz. rate to couple the individual R, G, and B fields of the RGB field sequence of the second (and subsequent even) frame(s) to RAM memories 522, 524 and 526, respectively, for storage therein.

Once memories 512, 514 and 516 of FIG. 5 are fully loaded after the RGB field sequence of the first (and subsequent odd) frame(s), a full color frame of information is available in memories 512, 514, and 516, and may be read from memories 512, 514 and 516 during the next following 0.0333 . . . second interval, during which memories 522, 524, and 526 are being loaded with the second frame. In order to achieve interleaving, even lines of memories 512, 514, and 516 of the first frame are read simultaneously during a first 0.0166 . . . second interval, and odd lines are read for the second 0.0166 . . . second portion of the 0.0333 . . . second reading interval. The even, and then the odd lines of the resulting R, G, and B line-scan signals read from memories 512, 514, and 516 are applied to upper terminals of switches 540, 542, and 544. A corresponding sequence of even, and then odd, lines is read from memories 522, 524, and 526 during the interval in which the third (and subsequent odd) field(s) are being loaded into memories 512, 514 and 516.

Output switches 540, 542, and 544 are controlled in common with input switch 528, as suggested by dash line 546. During the reading of memories 512, 514, and 516 to switches 540, 542, and 544, respectively, the switches are in their illustrated upper positions, to couple the signals so read by way of signal paths 95a, 95b, and 95c to a utilization apparatus, which may be a conventional RGB color monitor 96, as in FIG. 1, or which may a converter apparatus for generating the luminance and subcarrier color signal of an NTSC signal, or for any other conversion standard. At the moment that the full color frame of signals has been read to the utilization apparatus (not illustrated) from memories 512, 514, and 516, by way of switches 540, 542, and 544, respectively, in their illustrated positions, memories 522, 524, and 526 become fully loaded with the R, G, and B color fields of the second (and subsequent even) field(s). At this moment, switch 528, and switches 540, 542, and 544 ganged therewith, switch to their alternate positions (not illustrated), and memories 512, 514, and 516 are enabled for loading with the next odd frame, and memories 522, 524, and 526 are readied for reading to the lower terminals of switches 540, 542, and 544, respectively.

Figure 6:
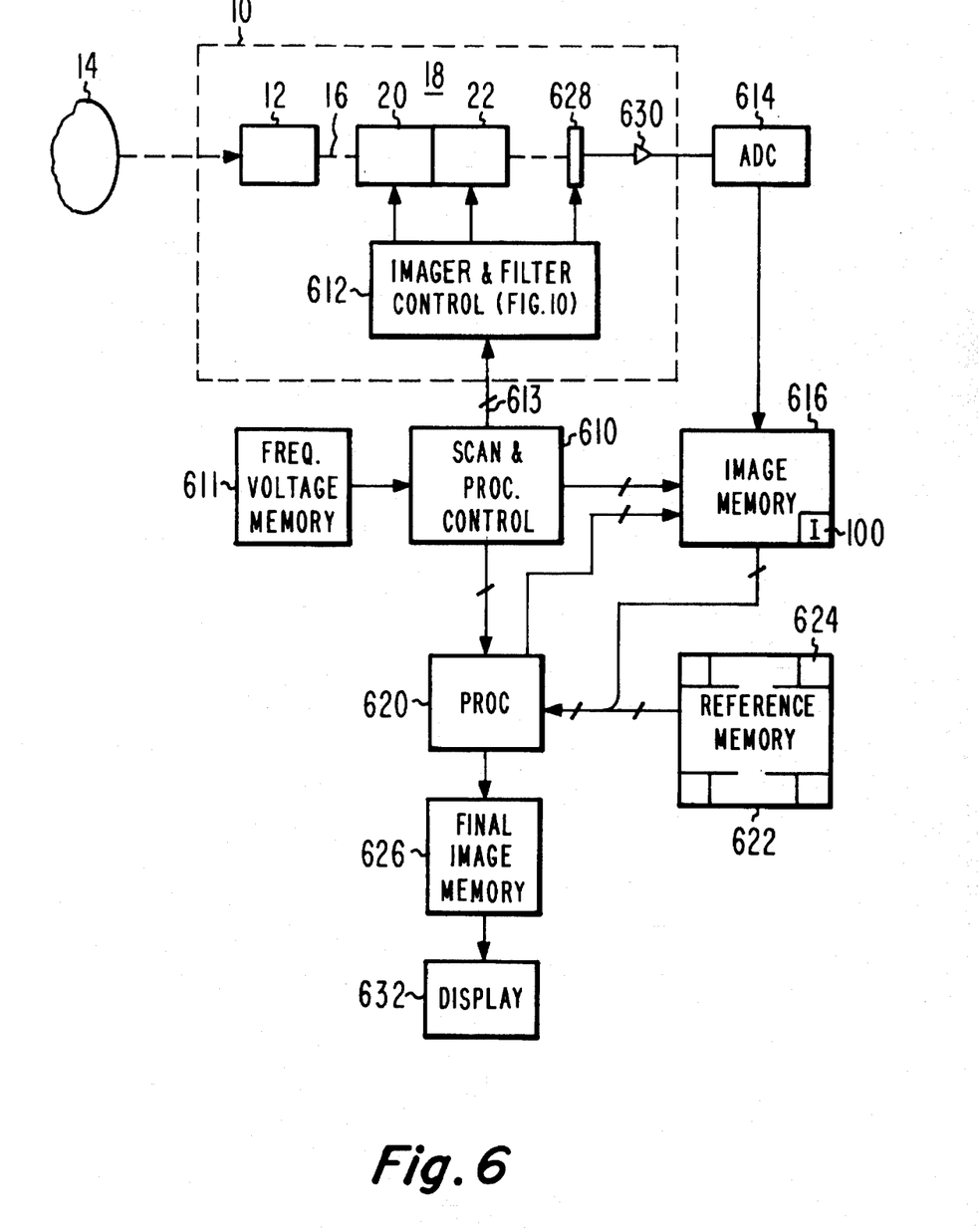
FIG. 6 is a simplified block diagram of a camera, similar to that of FIG. 1, for spectral analysis or "Tricorder" use.

FIG. 6 is a simplified block diagram of a camera, similar to that in FIG. 1, for spectral analysis or "Tricorder" use. Elements of FIG. 6 corresponding to those of FIG. 1 are designated by like reference numerals. In FIG. 6, the imager is represented as a CCD imager 628 with its associated amplifier 630, and the frequency controls for cascaded etalon filters 20 and 22 are represented, together with the scanning control for the CCD imager, as a block 612. The tricorder of FIG. 6 is controlled by a scan and processing controller 610, which is associated with a number of memories, including a voltage memory 611. The analog signal produced at the output of amplifier 630 of camera 10 is applied to an ADC 618, and the resulting digital signals are stored in the datels (data elements, corresponding to the storage of one bit) of an appropriate page of an image memory 616, as described below. For simplicity, assume that image memory 616 contains 100 pages (pages 0 to 99), each of which is sufficient for storage of the data from all of the pixels (picture elements) of CCD imager 628. The last page, namely page 99, of image memory 616, is reserved for storage of reference white information, which is derived from storage of the data from the pixels of CCD imager 628 when a white sheet is held before the imager, with the local illumination falling thereupon. This information is used, as described below, for normalizing the data.

The tricorder arrangement of FIG. 6 also includes a processor 620, which performs normalizing and other calculations, as described below, for spectroscopic analysis of objects in the field of view of the camera. A further memory 622, with individual pages, one of which is designated as 624, stores information relating to the relative luminosity of various materials at frequencies which can be scanned by camera 10 of FIG. 6. The materials which the tricorder can identify are those whose characteristics are stored in memory 622. Processors 620, in one mode of operation, compares normalized luminosities of each pixel at various light frequencies with the reference information stored in memory 622, to attempt to establish a match between the ratios of the luminosities at different frequencies for the pixel in question, so that it may be identified as belonging to a particular reference material. The substance identified as being associated with each pixel is then stored in a final image memory 626. When processor 620 has completed its comparisons, each pixel of final image memory 626 is loaded with signals representing the material identification, from which it may be recurrently displayed on a display 632, such as a color CCD matrix or a cathode-ray display, with identification of each different element by false color, or in some other manner. In the case in which imager 628 of FIG. 6 is a solid-state CCD imager and the display is a compact, low-energy display such as the above mentioned CCD matrix, the entire arrangement illustrated in FIG. 6 may be made as a small portable device powered by a battery.

Figure 7:
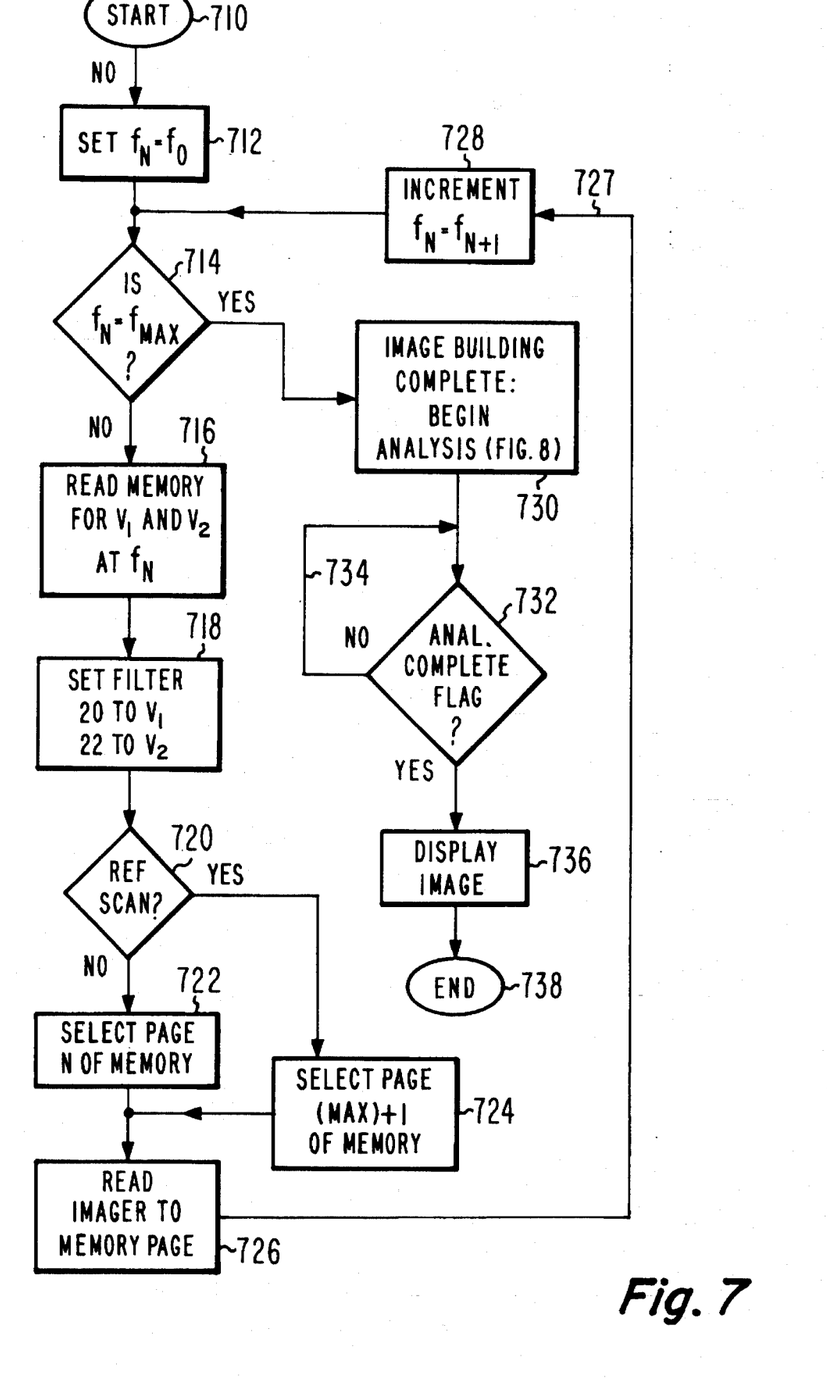
FIG. 7 is a simplified logic flow chart illustrating overall control of the tricorder of FIG. 6 by scan and processing control 610 of FIG. 6.
Figure 10:
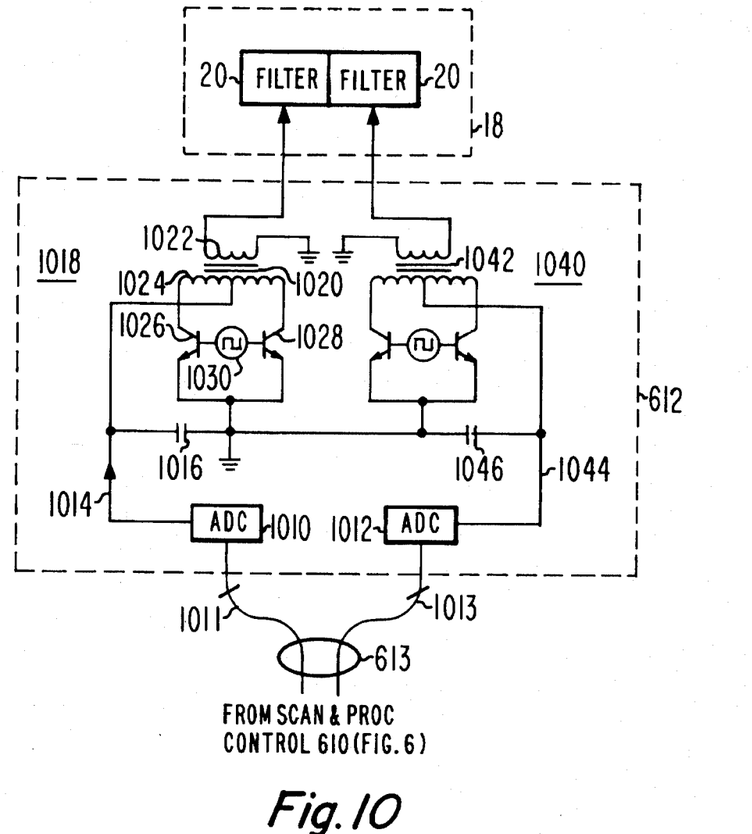
FIG. 10 is a simplified block diagram of the filter control portion of the arrangement of FIG. 6.

FIG. 7 is a simplified logic flow chart illustrating overall control of the tricorder of FIG. 6 by scan and processing control 610 of FIG. 6. In FIG. 7, the logic begins at a START block 710, and flows to a block 712, which represents the setting of a frequency variable $f_N$ to its lowest frequency, $f_O$. The logic then flows to a decision block 714, which compares the current value of $f_N$ with a maximum value which the frequency can attain, which may be the maximum frequency $f_{MAX}$ to which the etalon filters can be scanned, or the maximum frequency of interest for the materials being evaluated. If $f_N$ is less than $f_{MAX}$, the logic exits decision block 714 by the NO output, and reaches a block 716. Block 716 represents reading the voltages corresponding to frequency $f_N$ from memory 611 of FIG. 6, and block 718 represents the application of the resulting voltage-representative digital signals to a pair of digital-to-analog converters (not illustrated in FIG. 6) located in block 612 of FIG. 6, to thereby tune etalon filters 20 and 22 to frequency $f_N$. The conversion apparatus is illustrated in FIG. 10.

From block 718, the logic arrives at a decision block 720, which determines, as from a flag set by a pushbutton, if the current scan is for reference purposes, in which case a white card is held before the camera, to establish a baseline relating to the characteristics of the local illumination. If it is not a reference scan, the logic leaves decision block 720 by its NO output, and arrives at a block 722, which represents the selection of an appropriate page of memory 616 of FIG. 6 in which to store the pixel information for the current scan. One simple way to make the selection is to select page N, where N is the suffix which determines which frequency is being used. Thus, for scan N=0 at the lowest frequency $f_N$, the pixel information is stored in page 0 of the memory. If the scan is a reference scan, the logic leaves decision block 720 by the YES output, and arrives at a block 724, which represents selection of the last page, which in the simple example of 100 frequencies, would be page 99. By either path, the logic ultimately arrives at a block 726, which represents the pixel-by-pixel reading of the imager information, and its storage, datel by datel, in the designated page of memory 616. When the page of image has been stored, the logic flows by a path 727 to a block 728, which represents the incrementing of the frequency variable $f_N$ to $f_{N+1}$, and the logic flows back to block 714. The described loop continues, incrementing the frequency at each iteration, and storing image luminance information for each pixel of the image in the corresponding page of memory 616. Ultimately, all 99 frequencies will have been stepped through, and for each frequency, a corresponding image is stored in memory. When all the images have been stored, $f_N$ reaches $f_{MAX}$, and the logic leaves decision block 714 by the YES output. Naturally, the number of frequencies which are used (100 in the example) will depend upon the finesse of the frequency passband of the etalon filter, because there is little data to be gained by frequency increments $\Delta f$ which are much less than half the 3 dB bandwidth of the etalon filter passband.

Figure 8:
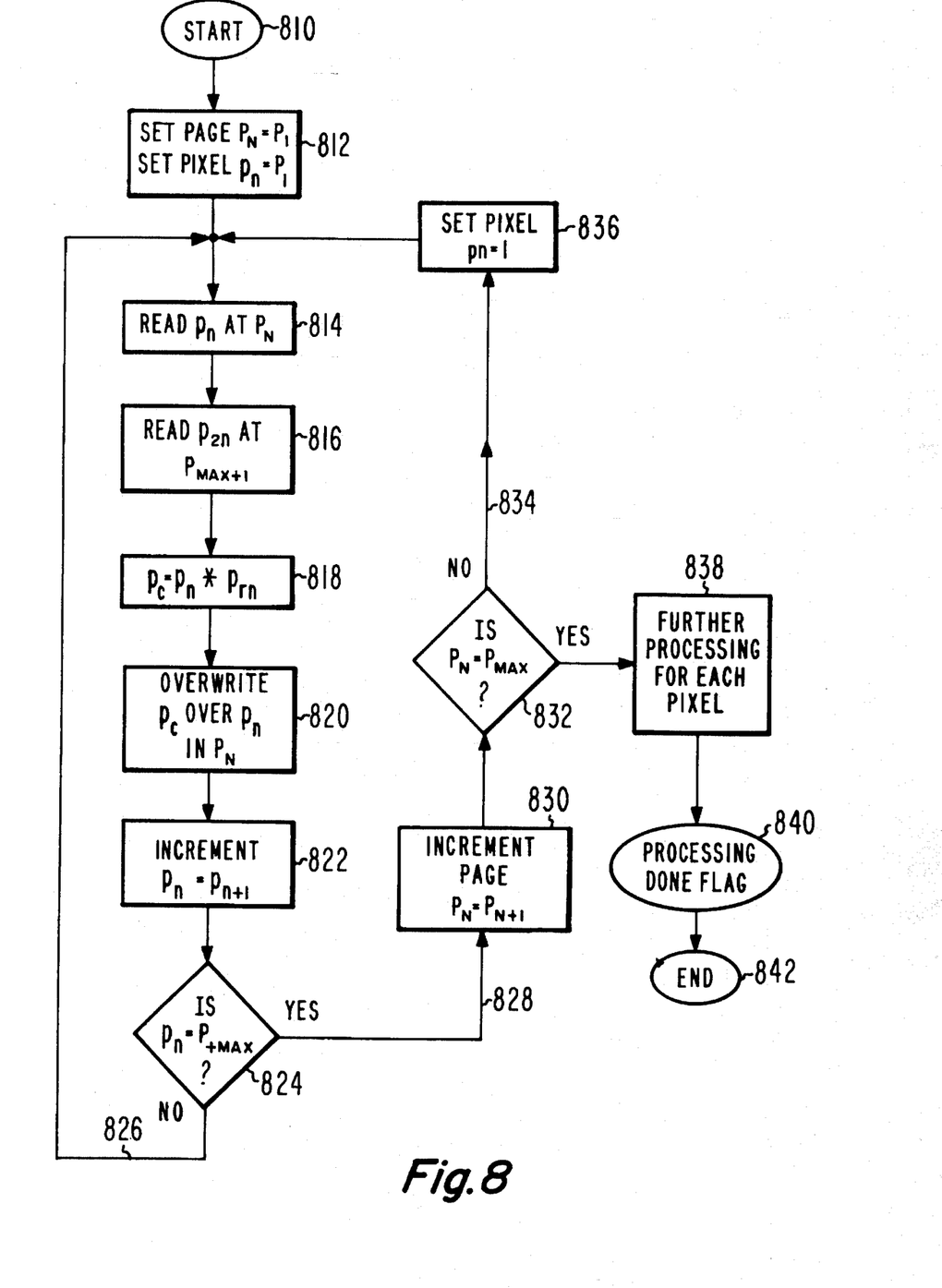
FIG. 8 is a simplified logic flow chart illustrating the operation of processor 620 of FIG. 6.

When all of the images made at different frequencies have been stored in memory 616 of FIG. 6, the logic flow from the YES output of decision block 714 of FIG. 7 reaches a block 730, which represents the recognition that a first step has been completed, and that analysis of the images should begin by invoking the flow chart of FIG. 8. The flow chart of FIG. 8 represents the operation of processor 620 of FIG. 6. During the analysis by processor 620, the logic of FIG. 7 is delayed by a delay represented as a decision block 732 and a feedback path 734, which enters an endless loop so long as the "analysis complete" flag is not present. When the analysis is completed by the processor 620, it indicates that the analysis is complete by setting an appropriate completion flag, whereupon the logic flow of FIG. 7 continues through delay 732/734 to a block 736 representing display of the analyzed image. The logic of FIG. 7 ends at an END block 738.

FIG. 8 is a simplified flow chart illustrating the operation of processor 620 of FIG. 6. The processing of FIG. 8 is invoked by the logic of FIG. 7 when it reaches block 730. The logic of FIG. 8 begins at a START block 810, and proceeds to a block 812, representing the setting of a running page variable $P_N$ to an initial value $P_1$, and the setting of a running pixel variable $P_n$ to an initial value $p_1$. The current value of $P_N$ represents the page of memory 616 of FIG. 6 which is currently being accessed by processor 610, and the current value of $p_n$ represents the current pixel on page $P_N$. Blocks 814–836 of FIG. 8 together represent the normalization of each pixel of the image data stored in memory 616 of FIG. 6, and the writing of normalized values back into the corresponding pixels of memory 616. In general, this is accomplished by multiplying each pixel by the known spectral characteristics of the ambient light, as determined by the reference information stored in memory page 99. More particularly, the logic flows from block 812 of FIG. 8 to block 814, which represents the reading of the current pixel $p_n$ of the current page $P_N$. Block 816 represents the reading of the corresponding pixel from page 99, the value of which indicates the amount of luminance in the local illumination at frequency $f_O$. Block 818 represents the multiplication of pixel $p_n$ of page $P_N$ by pixel $P_n$ of reference page 99, to thereby generate a normalized value of the pixel, compensated by the characteristic of the local illumination. From block 818, the logic flows to a block 820, representing the overwriting of the normalized pixel value over the current pixel value in the current page of memory 616 of FIG. 8. The running variable $p_n$ representing the current pixel is incremented, $p_n = p_{n+1}$, in block 822, and the logic then reaches a decision block 824, in which the current value of running variable $p_n$ is compared with a maximum value, which is the total number of pixels in imager 628 and in the current page $p_N$ of memory 616 of FIG. 6. So long as the current value of the pixel variable is less than the maximum value which it can attain in any image, the logic leaves decision block 824 by the NO output, and returns by a path 826 to block 814. The logic continues to flow around the loop including blocks 814–824, normalizing each pixel stored in page $P_N$ of memory 616 in turn, and rewriting the normalized pixel over its un-normalized value. Eventually, the last pixel of the current page will have been normalized, and the logic will leave decision block 824 by the YES output, and proceeds by path 828 to a block 830.

Block 830 of FIG. 8 represents the incrementing of running page variable $P_N$ according to $P_N = P_{N+1}$. The logic then reaches a decision block 832, in which the current value of page running variable $P_N$ is compared with the maximum number of pages, which in the example is 100 pages, with a highest data page number of 98 (page 99 is used for the reference illumination). So long as the value of running page variable $P_N$ is less than 98, the logic leaves decision block 832 by the NO output, and proceeds to a block 836, which resets the running pixel variable $p_n$ to its lowest value, such as 001, and the pixel-normalizing loop of blocks 814–824 is re-entered. Eventually, the pixel normalization will be finished for all 99 pages (highest page number 98), at which time the running page variable ($P_N$) reaches a value of 98, and the logic then leaves decision block 832 by its YES output. From block 832, the logic flows to further processing illustrated as a block 838, which represents comparison of the values of corresponding normalized pixels at each frequency to generate ratios representing the slope of the luminosity or reflectance as a function of frequency, and comparison of the resulting ratios with the ratios of known materials, to identify the material composing the surface which reflected the light which fell on the pixel in question. Absolute reflectances or luminosities may then be used to resolve ambiguities in the data provided by the ratios.

Figure 9:
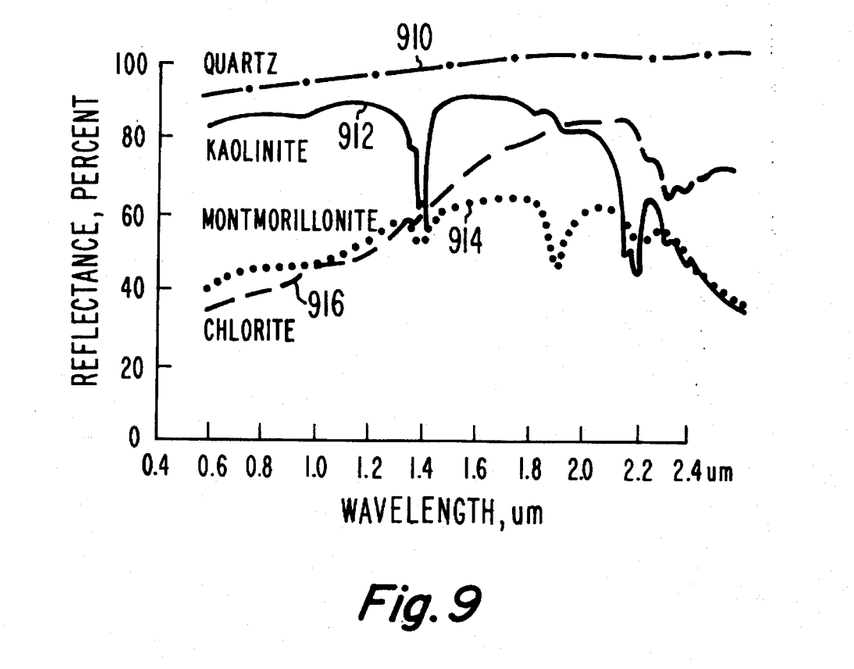
FIG. 9 plots reflectances in percent versus wavelength in micrometers (μm) for silicate minerals.

FIG. 9 plots reflectances in percent versus wavelength in micrometers (μm) for silicate minerals. In particular, plot 910 represents quartz, plot 912 represents kaolinite, plot 914 represents montmorillonite, and plot 916 represents chlorite. Suppose that a sample of material is known to contain only the above four materials. Camera 10 of FIG. 6 is directed at the sample, and scanning is performed to generate an image which represents the light reaching the imager at each of the 99 frequencies. Assuming that a total of 99 distinct spectral lines are measured, memory 616 of FIG. 6 will have about 100 pages, 99 of which each represent luminosity (related to reflectance) at a different spectral line. Starting with the first pixel of the image, the value of the first pixel stored in each page of memory 616 is compared with the value of the first pixel in the second page of memory. In other words, the ratio is formed between the value of the current normalized pixel and the corresponding pixel from the previous page. This is the ratio ($p_n$ of page $P_N$)/($p_n$ of page $P_{N+1}$), which is the slope of the reflectance (or luminosity, if desired) at the frequency in question. If the material of the first pixel were quartz, for example, the ratio for the first two pages would represent the slope of plot 910 of FIG. 9 at the lowest frequency (largest wavelength). If the material being examined has page-to-page ratios for any particular pixel with values which remain approximately constant at, or slightly above a value of 1.0, one can be fairly certain that the material at that pixel is quartz, rather than kaolinite, montmorillonite, or chlorite, because those materials have slopes, and therefore ratios, which change from frequency to frequency, due to the change in slope of the curves in various frequency ranges. The plots of FIG. 9 show that the quartz, kaolinite, montmoillonite, and chlorite have reflectance "signatures" which differ from each other, especially in that kaolinite has distinct "nulls" in the reflectance at 1.4 and 2.2 μm, montmorillonite has a reflectance null at about 1.8 μm, and chlorite has a distinct peak at about 2 μm, at which the ratios will change from positive to negative, as well as a relative null at about 2.2 μm. In a particular exemplary embodiment of the invention in which 100 frequencies are analyzed, each page of memory 622 stores 100 digital words identifying the 100 frequency increment ratios (and their polarities) associated with a known material, and possibly other digital words identifying absolute values. Thus, by comparing the ratios of reflectances, the nulls (slope polarity reversals) at 1.4 and 2.2 μm with the reflectances at, say, 1.0 μm, kaolinite can be identified as being different from any of the other materials on the list. Once the composition of the first pixel has been identified from among the possibilities (four possibilities in the example), the identity of pixel 1 can be stored in image memory 626 as a two-bit signal, whereupon processor 620 moves to the second pixel, and performs the same set of comparisons. Eventually, all the pixels in the image will have been identified as relating to one of the four materials, and image memory will be loaded with information which can be used to create an image which shows the material composition of the sample. The different materials can be displayed on display 632 as false-color images, in which each different material is displayed as a different color. For example, quartz might be displayed as white, kaolinite as green, montmorillonite as red, and chlorite as yellow or blue. The composition(s) of the sample being imaged, and the distribution of the materials within the sample, can then be determined by simply examining the image on display 632.

FIG. 10 is a simplified block diagram of the filter control portion of imager and filter control 612 of FIG. 6. In FIG. 10, digital signals representing voltages to be applied to filter 20 are applied to an ADC 1010 by way of a portion 1011 of bus 613, and digital signals representing voltages to be applied to filter 22 are applied to ADC 1012 by way of a portion 1013 of bus 613. ADC 1010 converts the digital signal into an analog voltage, which is applied by way of a path 1014 and a filter capacitor 1016 to the center tap of a primary winding 1024 of a transformer 1020 of a dc-to-ac inverter 1018. Inverter 1018 has the collectors of bipolar transistors 1026 and 1028 connected to the ends of primary winding 1024, and their emitters are grounded. The bases of transistors 1026 and 1028 are driven in antiphase by a source 1030 of square waves. The secondary winding 1022 of transformer 1020 is connected to filter 20. Those skilled in the art will recognize the structure of FIG. 10 as an arrangement for generating an alternating voltage with a peak magnitude which is determined by the digital signal applied over bus portion 1011. The digital signal applied over bus portion 1013 is similarly converted to analog form by ADC 1012, and applied by way of path 1044 and filter capacitor 1046 to an inverter 1040, which produces the desired alternating voltage across transformer secondary winding 1042 for application to filter 22.

Figure 11:
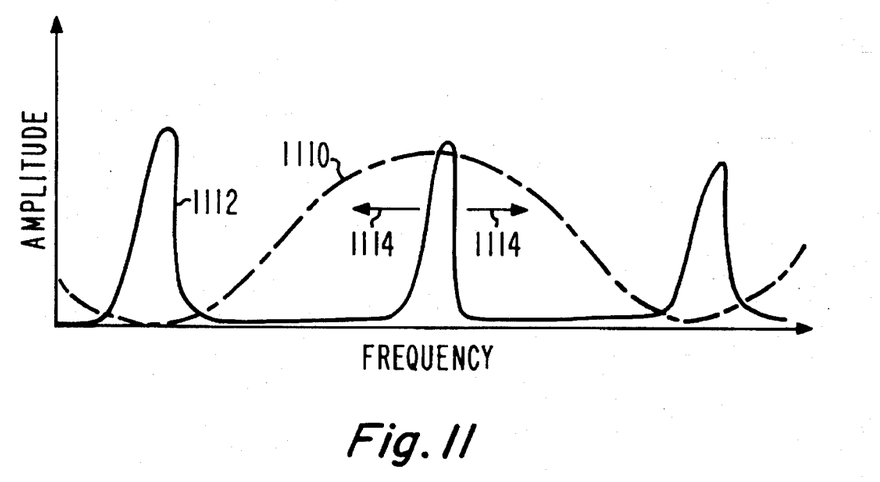
FIG. 11 represents the response of a fixed etalon filter cascaded with a variable-frequency etalon filter.

FIG. 11 illustrates the spectral response of cascaded etalon filters. In FIG. 11, plot 1110 represents the spectral response of a fixed-tuned etalon; plot 1110 has a fairly broad response peak. Plot 1112 represents the spectral response of an etalon having high finesse, tunable over a portion, indicated by arrows 1114, of spectral response 1110. As mentioned above, the finesse or bandwidth may be controlled in known manner.

Other embodiments of the invention will be apparent to those skilled in the art. For example, while a 90 Hz. rate has been described, the rate may be greater or less than 90 Hz. While liquid crystal etalons have been described, piezoelectric or other tunable etalons may be used instead, and different types of etalons, in any number, may be cascaded, if desired. Two-color systems have been experimented with, and may be useful for some applications; the invention may be used to generate two-color signals as well as three-color signals. While the substrates 210*l* and 210*r* of FIG. 2 have been described as being made from transparent silica or quartz, they may also be sapphire, ZnS, ZnSe, Ge, or glass. The image sensor has been described as being panchromatic, but need only be responsive to the colors of light which are expected to fall thereon, which may be termed a "polychromatic" response. For "tricorder" use, the frequency ranges may include infrared and ultraviolet.

What is claimed is

1. A television camera comprising:

a two-dimensional light sensing means for controllably generating line-scan signals representative of a light pattern falling thereon;

a light path terminating at said light sensing means;

a first agile etalon filter coupled in said light path, for selectively transmitting at least a selected spectral band, whereby said selected spectral band travels along said path to said light sensing means;

sensor control means coupled to said light sensing means for operating said light sensing means for generating a particular number of said line-scan signals during each of a plurality of sequential field intervals; and color filter control means coupled to said sensor control means and to said etalon filter, for controlling said etalon in synchronism with said light sensing means in such a manner that a different spectral band falls on said light sensing means from said light path during each of said plurality of sequential field intervals, whereby said light sensing means generates line-scan signals with field-sequential color characteristics.

2. A camera according to claim 1, wherein said light sensing means comprises a charge-coupled device (CCD) array.

3. A television camera comprising:

a two-dimensional light sensing means for controllably generating line-scan signals representative of a light pattern falling thereon;

a light path terminating at said light sensing means;

a first agile etalon color filter coupled in said light path, for transmitting a selected spectral band and a plurality of unwanted spectral bands associated with said selected spectral band;

sensor control means coupled to said light sensing means for operating said sensor means for generating a particular number of said line-scan signals during each Of a plurality of sequential field intervals;

color filter control means coupled to said sensor control means and to said first agile etalon color filter, for controlling said first agile etalon color filter in synchronism with said light sensing means in such a manner that a different set of colors falls on said light sensing means from said light path during each of said plurality of sequential field intervals, whereby said light sensing means generates line-scan signals with field-sequential color characteristics; and a second agile etalon color filter coupled in said light path, and coupled to said color filter control means, for selectively passing said selected spectral band, and for blocking said plurality of unwanted spectral bands associated with said selected spectral band, whereby said first and second agile etalon color filters coupled in said light path selectively pass only said selected spectral band.

4. A camera according to claim 3, wherein said light sensing means comprises a charge-coupled device (CCD) array.

5. A method for generating line-scan color signals, comprising the steps of:

operating an image sensor which is at least polychromatic, for producing line-scan signals representative of a light pattern falling thereon;

passing light from a scene to be imaged through an electronically scannable liquid Crystal color filter toward said image sensor, for controllably preferentially transmitting at least one color of light toward said image sensor;

controlling said image sensor for generating a particular number of said line-scan signals during each of a plurality of sequential field intervals; and controlling said color filter in time synchronism with said image sensor in such a manner that a different set of colors falls on said image sensor from said color filter during each of said plurality of sequential field intervals, whereby said image sensor generates said line-scan signals with field-sequential color characteristics.

6. A method according to claim 5, wherein said step of passing light from a scene to be imaged through an electronically scannable liquid crystal color filter toward said image sensor includes the step of;

passing light from said scene through a first agile liquid crystal etalon, for selectively transmitting at least a selected spectral band.

7. A method according to claim 5, wherein said step of operating an image sensor includes the step of operating a charge-coupled device (CCD) array image sensor.

8. A method for generating line-scan color signals, comprising the steps of:

operating an image sensor which is at least polychromatic, for producing line-scan signals representative of a light pattern falling thereon;

passing light from a scene to be imaged through an electronically agile, scannable first etalon color filter toward said image sensor, for controllably preferentially transmitting at least one color of light toward said image sensor;

controlling said image sensor for generating a particular number of said line-scan signals during each of a plurality of sequential field intervals; and controlling said first etalon color filter in synchronism with said light sensor in such a manner that a different set of colors falls on said light sensor from said first etalon color filter during each of said plurality of sequential field intervals;

wherein said step of passing light from said scene through a first etalon color filter results in transmitting a plurality of unwanted spectral bands associated with said selected spectral band reaches said light sensor, said method further comprising the step of;

applying said selected spectral band together with said plurality of unwanted spectral bands to a second etalon color filter, for selectively passing said selected spectral band to said image sensor, and for blocking said unwanted spectral bands of light, whereby said first and second etalon color filters together selectively pass only said selected spectral band, and said light sensor generates said line-scan signals with field-sequential color characteristics.

9. A method for performing spectral analysis, comprising the steps of:

imaging light from a scene to be analyzed onto a line-scan imager;

operating said line-scan imager at a field rate for producing successive fields of line-scan signals representative of light from said scene which reaches said imager;

controllably color filtering said light at a location between said scene and said imager by means of an electronically controllable agile color filter, whereby the color of light which is imaged onto imager may be controlled; and controlling said step of color filtering in conjunction with said step of operating said line-scan imager in such a manner that, within a set consisting of a plurality of said fields, a different color of said light is imaged onto said imager for each field of said set.

10. A method according to claim 9, wherein said step of imaging light onto a line-scan imager includes the step of imaging light onto a charge-coupled device (CCD) array.

11. A method for performing spectral analysis, comprising the steps of;

imaging light from a scene to be analyzed onto a line-scan imager;

operating said line-scan imager at a field rate for producing successive fields of line-scan signals representative of light from said scene which reaches said imager;

controllably color filtering said light at a location between said scene and said imager in conjunction with said step of operating said line-scan imager in such a manner that, within a set consisting of a plurality of said fields, a different color of said light is imaged onto said imager for each field of said set, by (a) passing said light from said scene through a first agile etalon color filter, for selectively transmitting at least a selected spectral band, whereby a first set of unwanted spectral bands of light reaches said imager, and (b) passing said selected spectral band through a second agile etalon color filter, and controlling said second agile etalon color filter for selectively passing said selected spectral band, and for blocking said first set of unwanted colors of light, whereby said first and second agile etalon color filters selectively pass only said selected spectral band.

12. A method for performing spectral analysis, comprising the steps of:

imaging light from a scene to be analyzed onto a line-scan imager;

operating said line-scan imager at a field rate for producing successive fields of line-scan signals representative of light from said scene which reaches said imager;

controllably color filtering said light at a location between said scene and said imager by means of an electronically controllable agile color filter, whereby the color of light which is imaged onto imager may be controlled;

controlling said step of color filtering in conjunction with said step of operating said line-scan imager in such a manner that, within a set consisting of a plurality of said fields, a different color of said light is imaged onto said imager for each field of said set.

storing said line-scan signals for at least a time equal to the duration of said set consisting of a plurality of said fields, to thereby generate stored information;

for corresponding pixels of each of said fields of each of said sets of fields of line-scan signals, generating ordered field-to-field color difference signals;

comparing said ordered field-to-field color difference signals with a plurality of sets of stored difference signals;

for each pixel, determining that one of said sets of stored difference signals which is most similar to said ordered field-to-field color difference signals; and displaying said pixels with at least one characteristic identifying said one of said sets.

13. An optical filter comprising:

a light path;

a fixed-tuned first etalon filter coupled in said light path, said fixed-tuned etalon having a particular finesse, for filtering said light with a first spectral peak; and an agile tuning second etalon filter located in said light path, said second etalon having a second finesse greater than said particular finesse, for filtering said light with a second spectral peak within, but narrower than, said first spectral peak, said second etalon including a frequency control input port, for controlling the frequency of said second spectral peak in response to an electrical control signal.

* * * * *